P. K. VAN YORX.
EXPRESSION MARKING FOR NOTE SHEETS.
APPLICATION FILED DEC. 21, 1908.

982,648. Patented Jan. 24, 1911.

UNITED STATES PATENT OFFICE.

PERCIVAL K. VAN YORX, OF MERIDEN, CONNECTICUT, ASSIGNOR TO THE WILCOX & WHITE COMPANY, OF MERIDEN, CONNECTICUT, A CORPORATION OF CONNECTICUT.

EXPRESSION-MARKING FOR NOTE-SHEETS.

982,648.  Specification of Letters Patent. Patented Jan. 24, 1911.

Application filed December 21, 1908. Serial No. 468,429.

*To all whom it may concern:*

Be it known that I, PERCIVAL K. VAN YORX, a citizen of the United States, residing at Meriden, county of New Haven, State of Connecticut, have invented certain new and useful Improvements in Expression-Marking for Note-Sheets, of which the following is a full, clear, and exact description.

My invention relates to an improved system for marking a music roll or note sheet to be used with mechanical music playing instruments such as piano-players, player-pianos, mechanically operated organs and the like.

The object of the invention is to provide a system of marking by which a single line may be employed to indicate two different kinds of expression, namely, volume and tempo. This line extends longitudinally of the sheet, so that as the note sheet traverses the tracker the operator will be advised thereby whether he is to maintain, increase or decrease the speed of the instrument, at the same time advising him also whether the volume of sound is to be maintained, increased or diminished.

In the accompanying drawings, I have conventionally illustrated a portion of a note sheet bearing thereon my improved marking.

Figure 1:
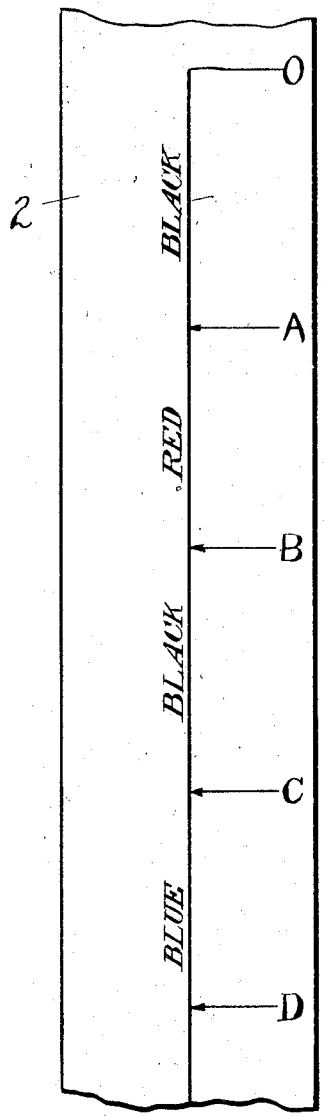
Figure 2:
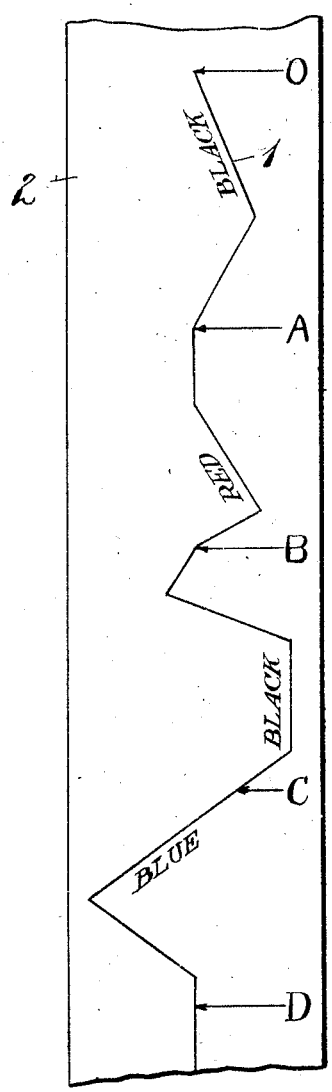

In the accompanying drawing, Figures 1 and 2 are each plan views of a portion of a note sheet with my improved marking thereon.

The reference numeral 1 is applied to the expression line in both figures, while the reference numeral 2 indicates the note sheet.

My invention comprehends a single line made up of different colors, each color having a distinctive meaning with reference to one kind of expression. The line thus formed may incline or move from the right to the left relatively to the length of the sheet to indicate another kind of expression.

Referring first to Fig. 1, I have shown a note sheet 2 for a composition in which it may be assumed there is to be no change in the volume, the expression changes being brought about solely by changes in speed. On Fig. 1 from the point indicated at O to the point indicated at A it may be assumed that the color of the line 1 is black, to indicate a normal speed (whatever normal speed may be selected for that section of the piece or composition). From A to B the color of the line 1 may be assumed to be red, which color may indicate a faster speed. From B to C the line 1 may be assumed to be black, indicating (as it originally did) a resumption of normal speed. From C to D the color of the line may be assumed to be blue, which color may indicate a slower speed, and so on.

From the foregoing it will be seen that the speed, and changes of speed, may be indicated clearly and unmistakably to the operator by the use of different colors which respectively and arbitrarily mean certain things.

Since variations in speed furnish one kind of change in expression, and variations in volume furnish another kind of change in expression, if it is desired to indicate a change in volume of sound, the line 1 may extend to the right and left of the sheet, as indicated in Fig. 2, to indicate the desired volume and changes therein. It must be assumed that it has been previously explained to the operator that when the line moves to the right it means one change in volume, for example, more volume; when it moves to the left it means another change in volume, for example, less volume; and when it continues parallel with the edge of the sheet it means a continuance of the same volume (whatever that volume happens to be), whether it be double, forte, pianissimo, or anything between said two extremes. It will now be seen that by this very simple expedient the operator may, by observing this single line, be guided as to a speed and volume (including changes therein) appropriate for the particular composition being rendered. So far as volume is concerned, it matters not whether the line is one color or another, and so far as speed is concerned, it matters not whether the line is running parallel with or at an angle to the edge of the sheet.

While I have described the marking, as though the different colors are to indicate speed, and the position of the line is to indicate volume; it is obvious that this plan may be reversed so that color will indicate volume, and the position of the line will indicate speed. This is an obvious reversal, which, if understood by the operator at the beginning of the piece, will afford him precisely the same guidance as first explained.

Note sheets such as I have described are usually perforated, said perforations being arranged in such manner as to control the instrument. I have not attempted herein to illustrate any perforations, since these are well known.

The line may be marked upon the sheet in any well known manner, so long as a line effect is produced.

It is obvious that suitable characters or symbols, well known or arbitrary, may be employed at any desired place or places on the sheet to furnish special instruction. These other marks would be merely additional refinements and are not essential to the fundamental idea of means herein disclosed and claimed, which means serve to guide the operator in the right direction without unduly limiting him in the exercise of his own individual conception of the precise degree of speed or volume, and changes therein, that are to be observed in any particular composition.

As is well known, no two composers or players have precisely the same conception of what constitutes the best rendering of a composition, but each has his own particular thought or fancy relatively thereto. While these thoughts would, in the main, probably harmonize, here and there variations will almost always occur. By my improved system of marking, a note sheet for any given composition may be provided with a guiding line or expression line (as I term it) which will afford the user directions as to an intelligent and artistic rendition of each particular piece. These directions, if followed, will so clearly guide him that he will render the piece intelligently and satisfactorily. By this system the intelligence of the operator is not subordinated to such an extent as to make him simply a part of a machine, but his musical sense is appealed to and cultivated.

What I claim is:

As an article of manufacture, an expression marking for perforated note sheets for mechanical music playing instruments, comprising a note sheet, a line thereon extending longitudinally thereof and composed of differently colored sections, said line extending to the right and left relatively to the edge of the sheet, the colors indicating respectively certain differences in one kind of expression, the deflection of the line indicating certain differences in another kind of expression.

PERCIVAL K. VAN YORX

Witnesses:
R. C. MITCHELL,
M. E. GARRETT.